Dec. 28, 1943.  A. S. SIPYAGUIN ET AL  2,337,688
APPARATUS FOR CONTINUOUS SACCHARIFICATION OF STARCH
Filed March 4, 1941
Fig. 1.
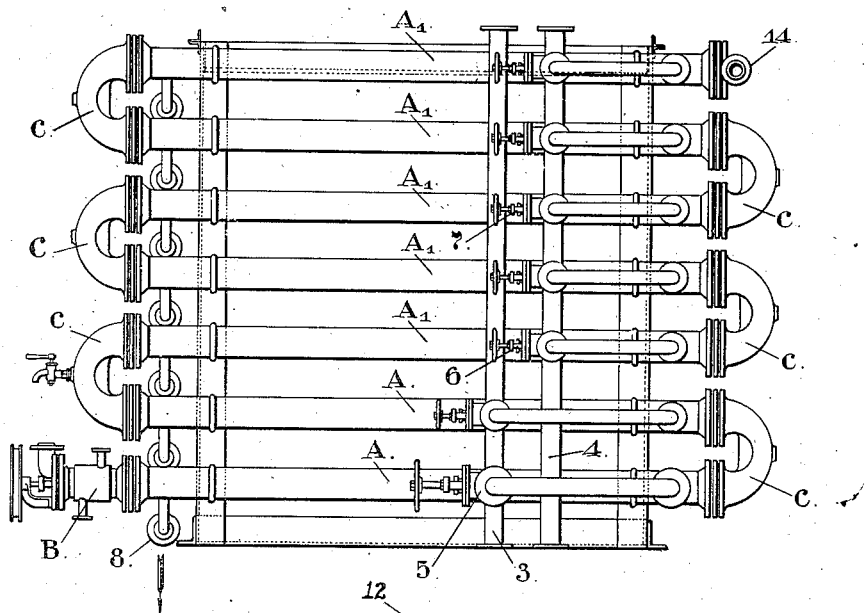
Fig. 3.
Fig. 2.
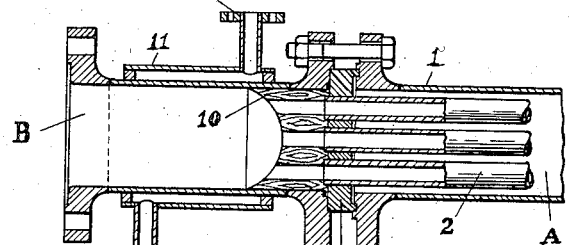
Inventors
A. S. Sipyaguin &
S. O. Shoemakher
By Glascock Downing & Seibold
Attys.

Patented Dec. 28, 1943

2,337,688

UNITED STATES PATENT OFFICE 2,337,688

APPARATUS FOR CONTINUOUS SACCHARIFICATION OF STARCH

Alexander Sergeevitch Sipyaguin and Sholom Oscarovitch Shoemakher, Moscow, Union of Soviet Socialist Republics Application March 4, 1941, Serial No. 381,752
In the Union of Soviet Socialist Republics
April 18, 1938

3 Claims. (Cl. 127—1)

There are known devices for saccharification of starch consisting of tubular heat exchangers arranged in succession, wherein the mixture of gelatinized starch milk and acids which flows in the tubes, is heated by steam entering the intertubular space.

In these devices it is however impossible to obtain a simultaneous saccharification and gelatinization as the gelatine formed by the starched milk clogs the tubes and deprives the liquid of a free movement therethrough.

In contradistinction thereto the proposed method and the apparatus therefor make possible an uninterrupted process of the saccharification of starch in such a manner, that saccharification and gelatinization are performed in the same apparatus, and besides this any chance of clogging of the tubes by the gelatine is entirely eliminated.

According to this purpose in the given invention the process is maintained at temperatures ranging from 110 to 230° C. and corresponding pressures. Measures are taken as to prevent a premature gelatinization of the starch milk which is conducted to the apparatus; these consisting in heat insulation of the fore-part of the apparatus, from which the starched milk is first conducted to the tubular heater, where the gelatinization and the saccharification of the starch are performed; it is even expedient to create an artificial cooling of this head-part of the apparatus.

In the drawing:

Fig. 1 is a general front view of the entire apparatus,

Fig. 2 is a plan view of the apparatus, and

Fig. 3 is a section of the cooling header of the apparatus on a magnified scale.

The apparatus consists of several (in the present case as shown in the drawing—seven) tubular heaters A and $A_1$ connected in succession by means of bends C, each of the heaters consisting of a casing 1 with tubes 2, inclosed in it (Fig. 3).

The intertubular space of the heater A is intended as a receiver for the steam entering from the mains 3 (Figs. 1, 2) by way of the valves 5 and 6. The condensate is removed by means of the tube 8.

The cooling header B of the apparatus (Figs. 2 and 3) is connected to the inlet end of the first tubular heat interchanger by means of a thick heat insulating layer 9. This layer 9 is perforated and surrounds the ends of the tubes 2. A wooden member 10, in which channels are provided, corresponding to the tubes in the heat exchanger is arranged within the header adjacent the layer 9 and forms an inlet extension for the tubes.

The header B is surrounded by a casing 11 provided with tubular pieces 12 and 13, through which the cooling water is led in and returned.

The action of the device is as follows:

The starch milk is diluted in a wooden vessel fitted with a stirrer (these are not shown in the drawing), the necessary quantity of acids being added thereby. Next the mixture is pumped into the header B and therefrom enters the tubes 2 of the first heat exchanger.

The steam is led into the intertubular space of the first two A-sections with such temperatures as to heat the mixture which flows through the tubes 2, up to the desired temperature. In the heat exchangers, wherein the mixture enters in cold condition after leaving the header B, the starch is first gelatinized and later, owing to a quick heating, builds a column of starched gelatine.

However, and under the influence of the high temperature of the walls the layer of gelatine, adjacent to these is soon liquefied and the little cylinder of gelatine is forced through under the pressure of the pumped liquid. Simultaneous saccharification and gelatinization are present only in the first A sections. Later the mixture is already liquefied and in the $A_1$ sections only saccharification is noted.

The discharge of the syrup is effectuated by means of the tube 14, whereon a suitable valve, not shown in the drawing, is installed.

Having described the proposed method and the manner in which it is to be performed, we herewith state, that what we claim is:

1. An apparatus of the character described including a connected series of heat exchangers including spaced tubes therein, inlets for conducting steam into the heat exchangers, an inlet header connected to one of the heat exchangers for conducting the material to be treated into the tubes, a cooling jacket surrounding the inlet header, inlet and outlet pipes for the cooling medium connected to said jacket, and heat insulating means between the header and the heat exchanger.

2. An apparatus of the character described including a connected series of tubular heat exchangers including spaced tubes therein, inlets for conducting steam into the intertubular spaces of the heat exchangers, an inlet header connected to one of the heat exchangers for conducting the material to be treated into the tubes, a heat insulating layer arranged between the header and the heat exchanger connected thereto and an additional heat insulating member arranged in the header and having channels therein registering with the tubes and forming extensions thereof.

3. An apparatus as claimed in claim 2 in which the heat insulating layer is perforated to accommodate the ends of the spaced tubes within the heat exchanger and means are provided for withdrawing any condensate forming in the walls of the heat exchangers.

ALEXANDER SERGEEVITCH SIPYAGUIN.
SHOLOM OSCAROVITCH SHOEMAKHER.